(12) United States Patent
Rice

(10) Patent No.: US 6,984,899 B1
(45) Date of Patent: Jan. 10, 2006

(54) WIND DAM ELECTRIC GENERATOR AND METHOD

(75) Inventor: Pahl W. Rice, Jewett City, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 129 days.

(21) Appl. No.: 10/789,484

(22) Filed: Mar. 1, 2004

(51) Int. Cl.
*F03D 3/04* (2006.01)

(52) U.S. Cl. ............................ 290/44; 290/55; 415/4.2; 416/197 A

(58) Field of Classification Search ................ 290/43, 290/44, 54, 55; 415/4.1, 4.2; 416/197 A
See application file for complete search history.

(56) References Cited

U.S. PATENT DOCUMENTS

| | | | | |
|---|---|---|---|---|
| 3,942,909 A | * | 3/1976 | Yengst | 416/132 B |
| 3,970,409 A | * | 7/1976 | Luchuk | 416/145 |
| 4,031,405 A | * | 6/1977 | Asperger | 290/55 |
| 4,174,923 A | * | 11/1979 | Williamson | 415/211.1 |
| 4,295,783 A | * | 10/1981 | Lebost | 415/4.4 |
| 4,474,529 A | * | 10/1984 | Kinsey | 415/4.2 |
| 4,551,631 A | * | 11/1985 | Trigilio | 290/55 |
| 4,585,950 A | * | 4/1986 | Lund | 290/44 |
| 4,600,360 A | * | 7/1986 | Quarterman | 415/148 |
| 4,606,697 A | * | 8/1986 | Appel | 415/4.4 |
| 4,834,610 A | * | 5/1989 | Bond, III | 415/53.3 |
| 5,009,569 A | * | 4/1991 | Hector et al. | 415/4.1 |
| 5,057,696 A | * | 10/1991 | Thomas | 290/44 |
| 5,336,933 A | * | 8/1994 | Ernster | 290/55 |
| 5,391,926 A | * | 2/1995 | Staley et al. | 290/55 |
| 5,478,197 A | * | 12/1995 | Schatz et al. | 415/2.1 |
| 5,503,530 A | * | 4/1996 | Walters | 416/197 A |
| 5,518,362 A | * | 5/1996 | Kivilammi | 415/2.1 |
| 5,852,331 A | * | 12/1998 | Giorgini | 290/55 |
| 6,239,507 B1 | * | 5/2001 | Douthit | 290/55 |
| 6,242,818 B1 | * | 6/2001 | Smedley | 290/44 |
| 6,249,059 B1 | * | 6/2001 | Hosoda | 290/55 |
| 6,448,669 B1 | * | 9/2002 | Elder | 290/54 |

* cited by examiner

*Primary Examiner*—Nicholas Ponomarenko
(74) *Attorney, Agent, or Firm*—James M. Kasischke; Michael P. Stanley; Jean-Paul A. Nasser

(57) ABSTRACT

A vertical axis windmill is provided wherein the amount of wind directed to blades in the power producing part of rotation and the mechanical load of multiple generators is controlled by a feedback control to maintain a relatively constant rotational frequency of the shaft of the windmill. In a preferred embodiment, two wind foils extend radially outwardly from the blades to thereby provide a scoop capable of pulling in more air than would normally be received by the blades. The wind foils then direct the wind flow to the power producing part of rotation of the blades for maximum power output, when necessary. The wind foils can close to control the wind flow to the blades. The generating capacity of a plurality of generators is also controlled in response to shaft rotation to maintain substantially constant shaft rotation.

15 Claims, 2 Drawing Sheets

WIND DAM ELECTRIC GENERATOR AND METHOD

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to generation of electrical power utilizing wind and, more particularly, to systems and methods for an increased efficiency wind power generator.

(2) Description of the Prior Art

At a time of both ever-increasing energy needs and non-renewable petroleum products to meet those needs, now is the time to consider the development and implementation of alternate energy sources. Wind generation of electricity is not a new idea; some believe the first wind generator was created by Poul la Cour in 1891 to generate hydrogen for the gaslights in his school. Since that time, a tremendous amount of engineering and development has gone into wind generators.

Bentz' law (formulated by the German Physicist Albert Bentz in 1919) states that you can only convert less than 16/27 (59%) of the kinetic energy of the wind to mechanical energy using a wind turbine. From research done in Denmark, a typical wind turbine generator runs at about 20% efficiency. This is primarily due to the effects of changing wind speed. For a particular wind turbine generator, calculations are made, based on the average wind speed for that area, to determine the optimum turbine and generator size. The maximum efficiency (typically about 40% to 50%) is reached at a particular wind speed. As the wind speed increases, the efficiency decreases.

Previous efforts to solve problems related to the above are described by the following patents:

U.S. Pat. No. 4,017,205, issued Apr. 12, 1977, to V. W. Bolie, discloses a vertical axis windmill having a horizontal base, preferably circular in configuration, sitting on the earth's surface, a dome having a horizontal bottom spaced above the base supported on a plurality of columns to provide an annular space below the dome bottom, a conical baffle positioned on the base below the dome, the conical axis being coincidental with the vertical axis of the dome, the dome having a circular roof orifice therein coaxial with the axis of the conical baffle, a vertical shaft supported coaxially by the conical baffle and an impeller affixed to the shaft and positioned in the dome circular orifice. Wind blowing relative to the windmill causes a lifting force by the aerodynamic effect of the dome, the wind passing upwardly through the annular opening and upwardly through the dome orifice, imparting rotational energy to the impeller. Power using apparatus such as generators or the like may be attached to the rotating vertical shaft. An alternate embodiment includes the utilization of a plurality of vertical vanes between the base and the dome, exterior of the conical baffle to more effectively direct the flow of air upwardly through the dome orifice.

U.S. Pat. No. 4,585,950, issued Apr. 29, 1986, to A. M. Lund, discloses multiple induction type generators drivingly connected to an impeller. As wind velocity increases, the generators are successively activated until all of the generators are operating at a maximum wind velocity. As the wind velocity decreases, the generators are successively de-activated until all of the generators are inoperative below a minimum wind velocity. Wind energy is more efficiently converted into electric power where impeller RPM must be maintained substantially constant under varying wind conditions to achieve the desired constant phase of the AC output.

U.S. Pat. No. 5,057,696, issued Oct. 15, 1991, to R. N. Thomas, discloses a vertical windmill employing aerodynamic lift includes stators that form an omnidirectional diffuser and can rotate out of the wind to reduce the destructive tendencies in high winds. A braking mechanism included in the windmill uses rotation of the airfoils to reduce the lift caused by the wind and disengagement of the airfoils to reduce nearly all lift on the airfoils. Centrifugal force is used to activate the brake in high winds, both to slow the rotor speed and, in extreme winds, to stop the rotor. A motor is provided to drive the windmill to simplify controls and increase energy production.

U.S. Pat. No. 5,518,362, issued May 21, 1996, to A. E. Kivilammi, discloses a method and wind power station for the utilization wind energy and transformation of wind energy into electrical energy. The wind power station comprises several rotors rotating by wind energy and connected to electricity producing generators. From these rotors the wind stream is directed also to a separate, main rotor to thereby maximize the output from a given stream.

U.S. Pat. No. 6,242,818, issued Jun. 5, 2001, to R. H. Smedley, discloses a vertical axis wind turbine having a plurality of blades around its periphery and a pivotable door associated with each blade. Each door has a pivot axis that is inclined outwardly toward the bottom of the turbine so that gravitational forces will pull the doors toward an open position. The doors are designed to move toward a closed position to at least partially block wind forces from the blades when the rotor rotates at potentially damaging speeds. The turbine has mating coils on the rotor and the support column to generate electrical energy when the rotor rotates.

U.S. Pat. No. 6,249,059, issued Jun. 19, 2001, to N. Hosoda, discloses a wind power device comprising a wind guide and a twisted member in the wind guide. The wind guide is rotatable around a vertical shaft so that a front opening of the wind guide may always face the wind. The wind which comes into the wind guide is guided around the twisted member and reaches to a blade wheel, which actuates a generator via gears to create electric power.

U.S. Pat. No. 6,448,669, issued Sep. 10, 2002, to D. M. Elder, discloses a turbine used to convert wind or fluid energy, and in some embodiments the kinetic energy of water, into mechanical energy, more specifically, a long axis type of vertical-axis turbine allowing large columns of air or water to be harnessed. These devices differ from horizontal-axis (propeller) type windmills or watermills which typically rotate about a vertical axis in order that they may face directly into a wind. The present invention is designed to be employed as a cost effective alternate power source in any wind or water current condition from a breeze to a gale wind, to a slow to moderate to fast water currents. To increase the structural integrity, the torque generating elements, namely, the rotor blades, are not directly attached to the shaft but rather, they attach to the round top and bottom rotor cage plates through which torque forces generated can be transferred to the shaft. The unique design of an open cover on the top of the wind or water turbine allows wind or water from the direction above the turbine to be harnessed. The top shield structure has created a calm wind or water area between the shield and the top of the rotor cage that helps reduce turbidity and greatly facilitates wind or water exhaust from the system.

U.S. Patent Application Publication No. 2002/0070558, published Jun. 13, 2002, to K. Johann, discloses a windmill for converting wind energy into electrical power and supplying it to a power grid, comprising a blade assembly, a generator housing, and a main shaft operatively coupled between the blade assembly and generator housing. The generator housing contains a first generator having a first generator output and a second generator having a second generator output. A hydraulic strut supports the generator housing and allows angular adjustment thereof. A hydraulic pump selectively pressurizes the hydraulic strut to effect adjustment thereof. A braking system is selectively actuable to slow rotation of the main shaft. A flyweight assembly and a four position speed sensing switch together detect rotational speed of the main shaft, selectively connect the generators with the main shaft, and selectively activate the braking system and hydraulic pump as appropriate according to the speed detected by the speed sensing switch.

The above patent applications do not describe a means for utilizing multiple generators and/or a variable wind dam for controlling windmill vertical rotor shaft rotational speed to thereby provide a substantially constant frequency output along with an increased efficiency wind power electrical generator. The solutions to the above-described problems have been long sought without success. Consequently, those skilled in the art will appreciate the present invention that addresses the above and other problems.

SUMMARY OF THE INVENTION

An object of the present invention is to provide an improved windmill electrical power generator.

Another object of the present invention is to provide a plurality of generators interconnected with the windmill in a manner whereby the generating capacity thereof is controlled in a manner to provide a substantially constant windmill shaft rotational speed.

Another object of the present invention is to provide moveable air foils operable for controlling the wind flow to windmill blades in the power producing part of their rotation.

These and other objects, features, and advantages of the present invention will become apparent from the drawings, the descriptions given herein, and the appended claims. However, it will be understood that above listed objects and advantages of the invention are intended only as an aid in understanding aspects of the invention, are not intended to limit the invention in any way, and do not form a comprehensive list of objects, features, and advantages.

Accordingly, the present invention provides a wind generator for generating electricity in response to wind flow comprising one or more elements such as, for instance, a vertical or horizontal axis windmill comprising a shaft and a plurality of blades secured thereto, at least two moveable air foils which form an adjustable size opening for directing a selectable amount of the wind flow into the plurality of blades, a base supporting the at least two air foils, the base being rotatably mounted for orienting the at least two air foils into the wind flow, a ring gear mechanically affixed to the shaft, and/or a plurality of generators arranged for mechanical interconnection with the ring gear. The entire unit just described can also be set up horizontally to minimize the overall height of the unit.

The plurality of generators may comprise moveable mechanical elements operable for mechanically engaging and for disengaging the plurality of generators with the ring gear. The wind generator may further comprise a control operable for maintaining a substantially constant rotating frequency of the shaft even as a speed of the wind flow changes. This is accomplished by selectively varying a generating power capability of the plurality of generators connected to the shaft through the ring gear. The control is preferably also operable for controlling wind flow to the plurality of blades through the adjustable size opening in coordination with generator power capability for maintaining the substantially constant rotating frequency of the shaft even as a speed of the wind flow changes.

In one embodiment, the plurality of generators may remain mechanically connected to the ring gear and the control is operable for controlling a stator current to thereby control the generating power capability. In another embodiment, the wind generator may further comprise moveable mechanical coupling elements such that the control is operable for mechanically coupling and uncoupling each of the plurality of generators from the ring gear to thereby control the generating power capability.

The wind foils are positioned and shaped to direct the wind flow substantially only to blades which are in a portion of a rotation to be moving in the same direction of the wind flow and to block wind flow to blades which are in a portion of the rotation to be moving in the opposite direction of the wind flow.

A method for operating the windmill for generating electricity comprises one or more steps such as, for example, connecting the plurality of generators such that a generating capacity thereof can be varied to thereby vary resistance to rotation of the axis, mounting the one or more moveable wind foils for controlling an amount of wind flow directed at wind blades in a power producing portion of a rotation around the axis, monitoring a rotational speed of the axis, and/or controlling the generating capacity and a position of the moveable wind foils responsively to the rotational speed of the axis to maintain a substantially constant rotational speed.

The method may further comprise mounting a flywheel to the axis to stabilize the rotational speed and/or may further comprise providing a ring gear on the flywheel for interconnection with the plurality of generators. The generating capacity may be varied by engaging or disengaging a respective rotor for each of the plurality of generators with respect to the ring gear. The method may further comprise varying the one or more moveable wind foils each time a respective of the plurality of generators is engaged or disengaged with respect to the ring gear.

In one embodiment, the method may further comprise providing at least two wind foils which are relatively moveable with respect to each whereby a variable opening is formed therebetween for controlling the amount of wind flow directed at wind blades in the power producing portion of their rotation around the axis. The generating capacity may also be varied by controlling a stator current for each of the plurality of generators.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

Figure 1A:
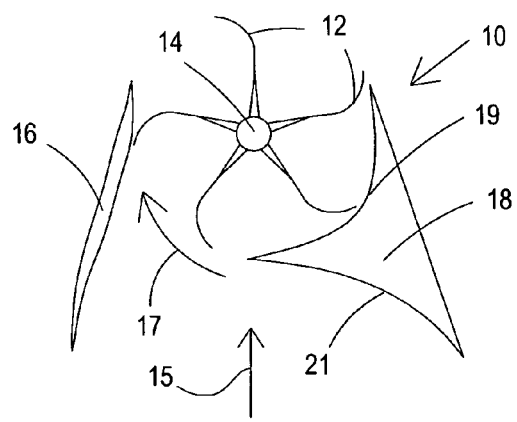
FIG. 1A is a diagrammatic view showing a wind dam comprising a windmill wherein the wind funnel structure is substantially open to wind flow in accord with the present invention.

Referring now to the drawings, there is shown wind dam generator 10 which uses wind as its source of power to generate electricity for public use. As shown in FIG. 2, wind dam generator 10 has an elongated cylindrical shape. Blades 12 may be made of fiberglass-reinforced plastics or any other suitable material and mounted in the center on an axle 14. On either side of the blades 12, on the front end of wind dam generator 10, which is oriented toward the incoming wind 15, are two wind funnel air foils 16 and 18, forming the wind dam. In one embodiment, both wind funnel air foils 16 and 18 are relatively moveable in orientation with respect to each other and axle 14. However, either air foil funnel structure 16 or 18 could be fixed with the other air foil funnel structure being relatively moveable, if desired. Thus, funnel structures 16 and 18 are relatively moveable with respect to each other so they can be opened or closed to moderate the amount of wind passing through the generator (see FIG. 1A, FIG. 1B, FIG. 1C, and FIG. 1D).

As noted, air foils 16 and 18 form a funnel that guides the wind to windmill blades 12. Preferably, air foil 18 may have an internal wind blocking circumference 19 that covers some blades 12 to prevent counter forces acting on the blades which would go against the direction of rotation as indicated by arrow 17. Thus, the arc of internal wind blocking circumference 19 may comprise about sixty to one hundred degrees of the rotational circle. Flow of the wind against those blades covered by internal wind blocking circumference 19 would have counter forces produced on axel 14 if the wind were to encounter them. On the other hand, the remaining blades which are not covered by internal wind blocking circumference 19 are in the power producing part of their rotation. By directing air flow onto these blades, the power produced in axel 14 is maximized.

Air foil 18 at least would include guide surface 21 which extends radially outwardly from the outermost reach of blades 12 to scoop out additional wind and direct that wind to the power producing blades. Conceivably guide surface 21 may also be sufficient to block the air flow significantly without the use of blocking surface 19, if desired.

Figure 1B:
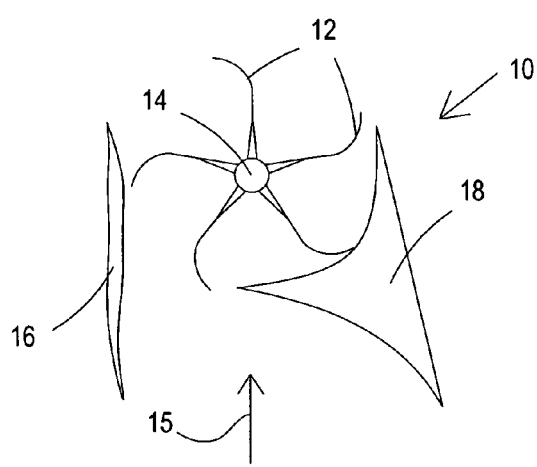
FIG. 1B is a diagrammatic view showing the wind dam of FIG. 1A with a windmill wherein the wind funnel structure is in the process of closing to restrict wind flow in accord with the present invention.
Figure 1C:
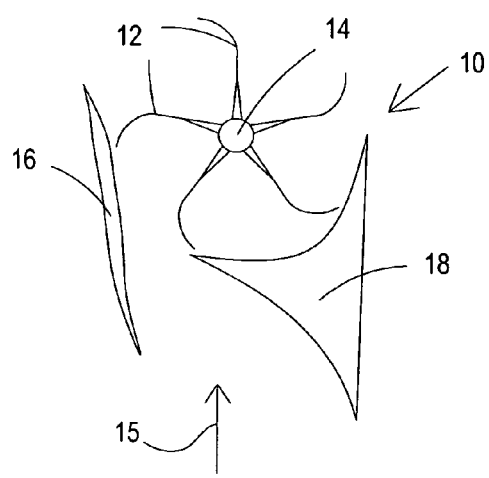
FIG. 1C is a diagrammatic view showing the wind dam of FIG. 1B with a windmill wherein the wind funnel structure continues to close to restrict wind flow in accord with the present invention.
Figure 1D:
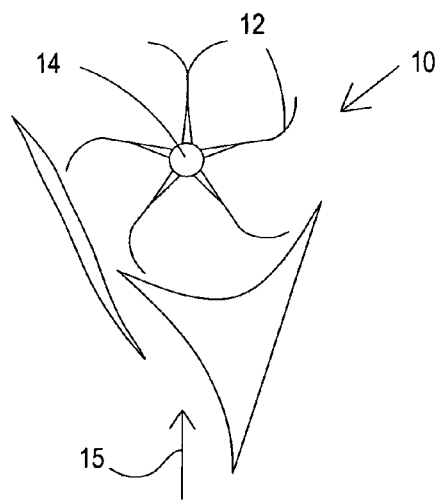
FIG. 1D is a diagrammatic view showing the wind dam of FIG. 1C with a windmill wherein the wind funnel structure is substantially closed to restrict wind flow in accord with the present invention.
Figure 2:
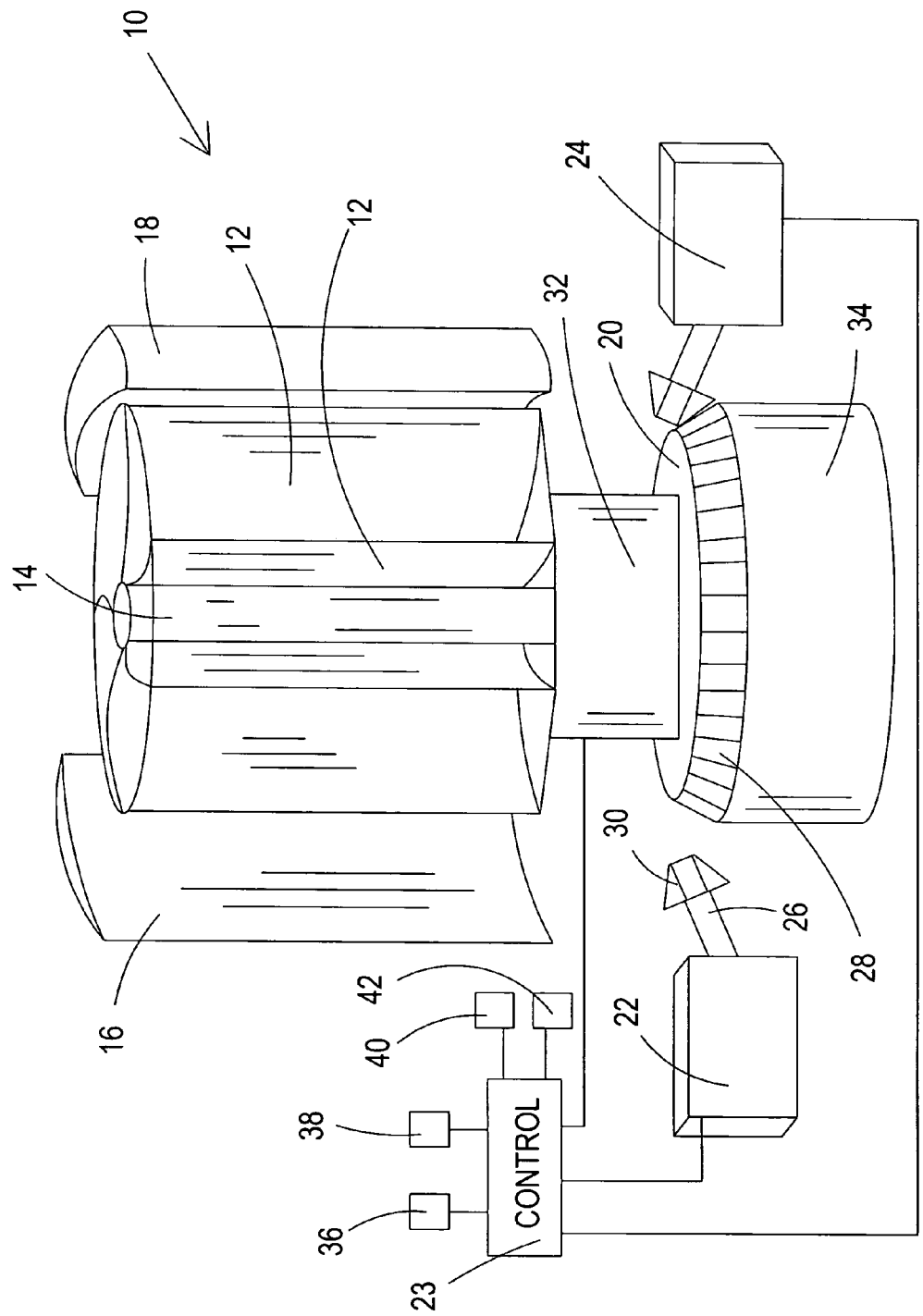
FIG. 2 is a perspective view showing a vertically oriented wind dam with a windmill and a variable opening wind funnel structure in accord with the present invention.

Air foil 16 may preferably be used as the other side of the funnel to scoop in air from a large radius and direct the air to the power producing blade as indicated in FIG. 1A. As necessary, the opening through which the air flows between air foils 16 and 18 can be greatly restricted as indicated in FIG. 1B, FIG. 1C, and FIG. 1D. As indicated, the two air foils 16 and 18 produce a variable opening funnel which can selectively either introduce air from a region of air with a diameter greater than the radius of blades 12 which is preferably applied only to the power producing blades, or can be narrowed to any extent including air from a region of air much smaller than the diameter of the radius of blades 12 for introduction preferably to the power producing blades. Control 23 may be utilized to monitor axel rotational speed for opening and closing air foils 16 and 18 as desired.

At the base of blades 12 is, in one embodiment, large gear flywheel 20. Flywheel 20 serves two purposes; one is to limit the change in speed due to wind gusts, and the other is to provide a support for ring gear 28 which interconnects with multiple generators, and if desired, allows multiple generators, such as generators 22 and 24, to be mechanically connected/disconnected to thereby come on and off line as the wind speed changes. In a preferred embodiment, wind dam generator 10 would typically comprise four to eight generators. Mounting the generators on the ground allows use of much larger generators than those that are mounted on the shaft as is used in the prior art.

If engageable/disengageable mechanical interconnections are utilized as in one embodiment of the invention, then generator shaft 26 could be connected by a universal joint to thereby permit raising and lowering shaft 26 for interconnection with gear 28 of flywheel 20. As one possible alternative, generator 22 could be slidably mounted to thereby move gear 30 into engagement with ring gear 28. Synchromesh gear arrangements, as could be provided in various ways, would permit smooth engagement and disengagement. As another possibility, the generators may be connected through a clutch. In yet another embodiment, all generators could remain connected mechanically through fly wheel 20 or by other mechanical connections and the engagement/disengagement of the generator could be effected electrically by controlling the stator current of each generator to thereby control the physical resistance encountered by each generator shaft 26, as discussed in more detail hereinafter. However the generators are interconnected and operated, the generators are preferably utilized as a means for maintaining a constant shaft speed. Constant shaft speed results in a constant frequency output of the power, which is desirable especially if power is applied to a power grid.

Wind dam generator 10 is preferably mounted on controlled rotating platform 32 that would keep the wind dam generator 10 pointing into the wind (see FIG. 2), preferably by automatic control with control 23. Base 34 supports the entire structure.

One embodiment of a method of operation for wind dam generator 10 is as follows; when the wind reaches a minimum speed to provide the desired frequency of operation with airfoils 16 and 18 open, (typically 6 to 10 m.p.h.) the first asynchronous generator, such as generator 24, would be connected to gear 28 on flywheel 20. This would start producing the minimum rated amount of electricity for the generator at the desired frequency of operation, e.g., 50 Hz or 60 Hz. As the wind increases in speed, airfoils 16 and 18 on either side of the blades would start to close, to keep the generator turning at a constant speed (to produce alternating current (AC) electricity at the constant desired frequency). When the wind reaches a particular higher speed, airfoils 16 and 18 on either side would open, allowing more wind to enter the blades and, at the same time, another generator, such as generator 22, would be mechanically connected to the gear at the base of the unit. This process would continue as the wind speed increases. As indicated above, preferably from about four to eight generators would be available. The airfoils would continue to close together until another threshold was reached, then they would open and another generator would be added. This process would use wind energy much more efficiently than the current large wind blade style. It would be able to produce electricity at a lower wind speed, and continue to efficiently extract energy from much higher wind speeds. The frequency of electricity produced would be kept at a more consistent value while the amperage increased or decreased along with the wind. The order of implementation for the generators would preferably be in a circular queue. The first would be added, then the second, then the third, as the wind increases. When the wind starts to decrease, the first generator would be removed. If the wind increased, the fourth generator would be implemented. This would continue in a circular fashion until it came back around to the first generator. This process would ensure that all generators would statistically get the same amount of use and that a generator could be taken off line for maintenance without affecting power generation. It also optimizes the efficiency of the unit. Cooling would be done at the same rate as the addition and deletion of generators to implement only the cooling that is required. The optimum number of generators for the system would be determined through wind characteristics of the location of the wind dam generator 10 and through experimentation.

Control 23 may be utilized with suitable programming for monitoring wind speed, and the number of generators, and the opening of air foils 16 and 18, and for orienting the air foils towards into the wind direction by rotating base 34. Thus., control 23 could be programmed to monitor axel rotational speed and adjust the other factors accordingly in a feedback circuit.

As the wind speed increased, so would the number of generators. Instead of wasting the extra energy of the higher wind speeds, it would be collected by another generator. The wind dam generator 10 would not be limited by the power rating of a single generator. It would be able to maintain a 30% to 40% efficiency over a broader range of wind speeds.

In another embodiment, all generators would remain connected with respect to flywheel gear 28 or other gearing. Initially, the stator current in each generator would be zero or near zero and the generators effectively disconnected because with zero current, and assuming no magnetic residual, there is no resistance except friction resistance. The additional rotating shafts would also provide a flywheel effect as discussed above for reducing minor variations in shaft speed. With the wind foils open, once the shaft came up to the desired frequency of rotation, then stator current would be applied to one or more generators thereby controlling the torque or force required to rotate the generator shaft, and the force acting against rotation of axel 14. In this case, control 23 may comprise a feedback system which would then control the stator current based on the rotational speed of axel 14. As axel speed starts to drop, the stator current would be reduced to permit easier rotation of axel 14 thereby maintaining the rotational frequency. As axel speed starts to rise, an increase in stator current would increase the rotational resistance to maintain the shaft rotational speed. The current output would vary accordingly. If the wind becomes too high after all generators are operating at maximum, then air foils 16 and 18 would begin closing to reduce the wind to maintain the frequency. Items 36 through 38 may symbolically represent sensors such as wind direction sensors, air speed sensors, air foil position sensors, rotatable base 32 position sensor, axel rotation speed sensor, generator sensors, other desired sensors and actuators, and could also represent additional generators that may preferably be utilized.

The advantages of the present invention include a smaller footprint than the standard large blade generators, and a much more intelligent, efficient generator that could produce more power over a broader range of wind speeds. As another advantage, the entire wind dam generator can be built with either a vertical or horizontal shaft or actually a shaft with any orientation. If built with a horizontally oriented shaft, for instance, the overall height of the unit can be greatly minimized. Moreover, a horizontal blade shaft could be very long, but the unit would still have a minimal height due to the fact that the entire unit is on its side. Therefore, the present invention may be used in places where height is an issue and in places where height is not an issue.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A wind generator for generating electricity in response to wind flow, comprising:
   a windmill comprising a shaft;
   a plurality of blades secured to said shaft;
   at least two moveable air foils which form an adjustable size opening for directing a selectable amount of said wind flow into said plurality of blades;
   a base supporting said at least two air foils, said base being rotatably mounted for orienting said at least two air foils into said wind flow;
   a ring gear mechanically affixed to said shaft; and a plurality of generators arranged for mechanical interconnection with said ring gear.

2. The wind generator of claim 1 wherein each of said plurality of generators comprise mechanical elements operable for mechanically engaging and for disengaging said generator with said ring gear.

3. The wind generator of claim 1 further comprising a control operable for maintaining a substantially constant rotating frequency of said vertically oriented shaft even as a speed of said wind flow changes by selectively varying a generating power capability of said plurality of generators connected to said shaft through said ring gear.

4. The wind generator of claim 3, wherein said control is operable for controlling wind flow to said plurality of blades through said adjustable size opening in coordination with varying said generating power for maintaining said substantially constant rotating frequency of said shaft even as a speed of said wind flow changes.

5. The wind generator of claim 4 further comprising moveable mechanical coupling elements such that said control is operable for mechanically coupling and uncoupling each of said plurality of generators from said ring gear to thereby control said generating power capability.

6. The wind generator of claim 3 wherein said control is operable for controlling a stator current associated with each of said plurality of generators to thereby control said generating power capability.

7. The wind generator of claim 1 wherein said at least two moveable air foils are positioned and shaped to direct said wind flow substantially only to blades which are in a portion of a rotation to be moving in the same direction of said wind flow and to block wind flow to blades which are in a portion of said rotation to be moving in the opposite direction of said wind flow.

8. A method for operating a windmill for generating electricity, comprising an axis rotated by a plurality of wind blades, said windmill comprising a plurality of generators, said windmill comprising at least one moveable wind foil, said method comprising:

monitoring a rotational speed of said axis;

varying a generating capacity of said plurality of generators to vary resistance to rotation of said axis;

controlling an amount of wind flow directed at wind blades in a power producing portion of a rotation around said axis by utilizing said at least one moveable wind foil; and maintaining a substantially constant rotational speed by controlling said generating capacity and a position of said at least one moveable wind foil in response to said rotational speed of said axis.

9. The method of claim 8 further comprising mounting a flywheel to said axis to assist in maintaining said substantially constant rotational speed.

10. The method of claim 9 further comprising providing a ring gear on said flywheel for interconnection with said plurality of generators.

11. The method of claim 10 wherein said generating capacity is varied by selectively engaging a respective rotor for each of said plurality of generators with respect to said ring gear.

12. The method of claim 11 further comprising varying at least one said moveable wind foil each time a respective of said plurality of generators is selectively engaged with respect to said ring gear.

13. The method of claim 12 further comprising providing at least two wind foils which are relatively moveable with respect to each other whereby a variable opening is formed therebetween for use in said step of controlling said amount of wind flow directed at wind blades in said power producing portion of said rotation around said vertical axis.

14. The method of claim 8 wherein said generating capacity is varied by controlling a stator current for each of said plurality of generators.

15. The method of claim 8 wherein said step of controlling an amount of wind flow further comprises extending at least two wind foils radially outwardly from the wind blades to thereby provide a scoop capable of pulling in more air than would otherwise be received by the wind blades.

* * * * *